June 4, 1946.  E. F. W. ALEXANDERSON  2,401,450
CONTROL SYSTEM
Original Filed Jan. 31, 1935
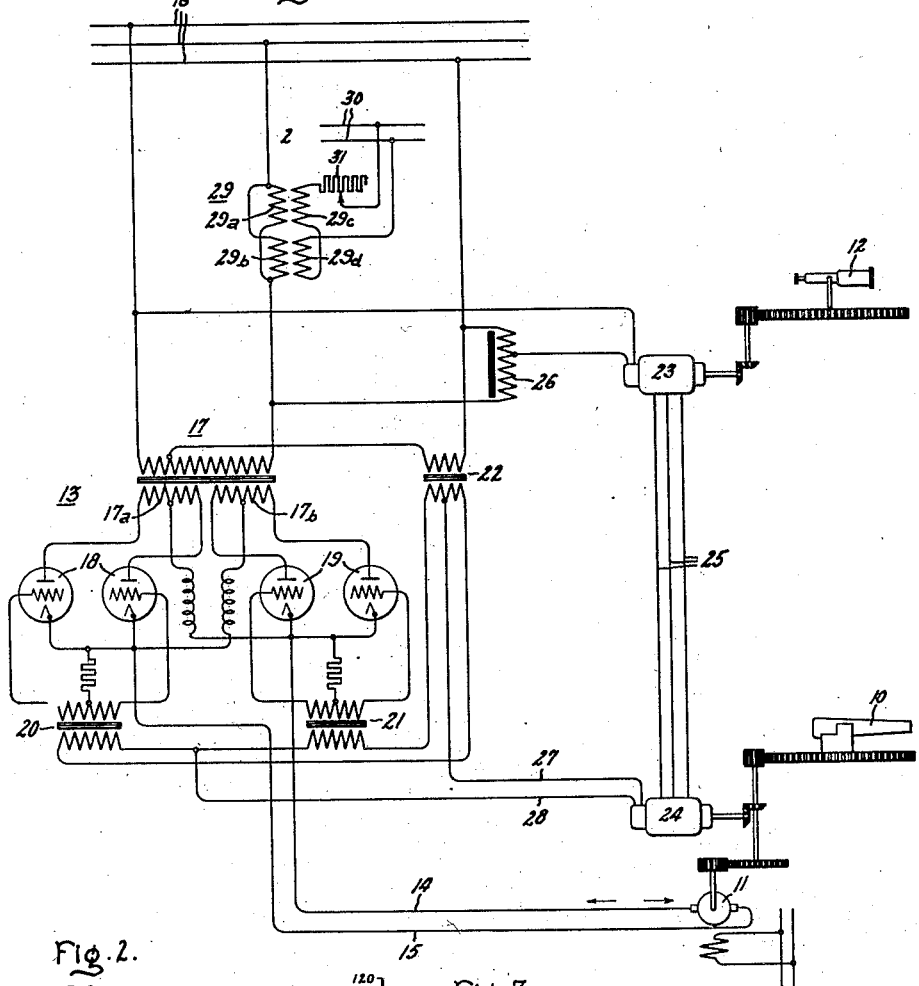
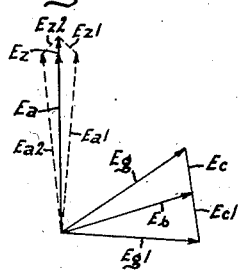
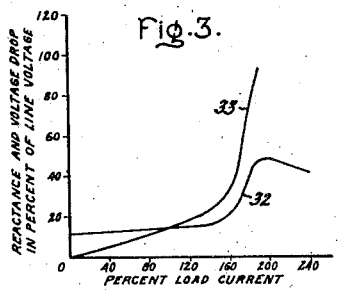
Inventor:
Ernst F. W. Alexanderson,
by Harry E. Dunham
His Attorney.

Patented June 4, 1946

2,401,450

UNITED STATES PATENT OFFICE 2,401,450

CONTROL SYSTEM

Ernst F. W. Alexanderson, Schenectady, N. Y., assignor to General Electric Company, a corporation of New York Application January 31, 1935, Serial No. 4,332
Renewed March 2, 1936

8 Claims. (Cl. 172—239)

This invention relates to control systems, more particularly to systems for controlling the operations of electric motors supplied from electric valve apparatus, and it has for an object the provision of a simple, reliable and improved system of this character.

In systems in which the motor drives a large inertia load, it is necessary to utilize a current limiting means in order to prevent destruction of the electric valves by high current peaks which arise during acceleration, deceleration and rapid reversals. Heretofore, current limiting resistances have been utilized for this purpose, but these are unsatisfactory because of the large energy losses involved and furthermore because of the resulting reduction of the voltage supplied to the motor when operating at or near full load. For example, a motor which attains a speed of 1000 R. P. M. at full rectified voltage of the valve apparatus, will approach this speed when running light, even with the current limiting resistance included in circuit. However, when the motor has work to perform, the current causes a corresponding drop in the voltage impressed upon the motor, and of course, the resistance limits the current so that at 500 R. P. M. the motor can develop only half as much torque as it could at stand-still. If the current limiting resistance is not utilized, the electric valve apparatus would be capable of delivering maximum rated current at full rectified voltage, and this would cause the motor to operate at 1000 R. P. M. Thus it is seen that when the current limiting resistance is used, the motor delivers only one-fourth as much power, i. e., half torque at half speed, as it could deliver if no resistance be used. In addition, the efficiency is low due to the energy absorption in the resistance. Accordingly a further object of the invention is the provision of means for limiting the motor current at stand-still to a predetermined safe value, which allows the motor to absorb substantially maximum current at full speed.

In certain applications, an inertia load may over-run the point of correspondence with a control device, in which case it is desirable that the electric valve apparatus shall function as an inverter and return energy to the line, thereby causing the motor to act as a brake. A still further object of the invention, therefore, is the provision of a current limiting device which will not interfere with and which will aid this inverter operation.

In carrying this invention into effect in one form thereof, an electric motor is supplied with rectified voltage by means of suitable electric valve apparatus which is provided with an anode and a control grid. Alternating voltage is supplied to the anode and grid from a suitable source, and means are provided for varying the phase relationship between the grid and anode voltages to control the rectified voltage supplied to the motor. A reactance device having a reactance characteristic varying with the current flowing in its reactance winding, is included in the power connection between the source and the anode.

In illustrating the invention, it is shown as embodied in a follow-up motor control system in which the motor drives a heavy inertia load.

For a better and more complete understanding of the invention, reference should now be had to the following specification and to the accompanying drawing, in which Fig. 1 is a simple diagrammatical representation of an embodiment of the invention; Fig. 2 is a vector diagram serving to explain the operation; and Fig. 3 is a chart of characteristic curves explanatory of the operation.

Referring now to the drawing, a load having large inertia such for example as a gun 10 is driven by an electric motor 11 under the control of a pilot device, such as a telescope 12, in such a manner that the gun follows the motion of the telescope. The motor 11 is preferably of the direct current type and is supplied with rectified voltage by means of suitable electric valve apparatus 13, to the output circuit of which the armature terminals of the motor 11 are connected by means of conductors 14 and 15. The electric valve apparatus 13 is itself supplied from a suitable source of alternating voltage such for example as the three phase supply source represented by the three supply lines 16, by means of a suitable supply transformer 17, the terminals of the primary winding of which are connected to the upper and middle lines of the supply source 16 as illustrated. As shown, the electric valve apparatus 13 comprises a pair of electric valves 18 connected for full wave rectification for supplying rectified voltage of one polarity to the armature of the electric motor 11 and a similar pair of electric valves 19 also connected for full wave rectification for supplying rectified voltage of opposite polarity to the motor 11.

The electric valves 18 and 19 are preferably of the three electrode type into the envelopes of which a small quantity of an ionizable medium such for example as mercury vapor is introduced after exhaust. The presence of this medium within the envelope serves to convert the usual electron discharge into an arc stream thus constituting the valves electrostatically or grid controlled arc rectifiers.

The plates or anodes of the valves 18 are respectively connected to the opposite terminals of the portion 17a of the secondary winding of supply transformer, the mid-point of which winding portion is connected to the conductor through a suitable smoothing reactor, whilst the cathodes of this pair of electric valves are directly connected to the conductor 15. The valves 19 are connected to the portion 17b of the secondary winding of the supply transformer and to the conductors 14 and 15 in a similar manner. Current flows in the cathode-anode or output circuit of the electric valves of this type only during that half cycle of the anode voltage which is positive with respect to the cathode voltage and this flow of current is initiated by supplying to the control grid a voltage that is more positive with respect to the anode voltage than a predetermined critical value. By varying the point in the cycle of the anode voltage at which the grid voltage becomes sufficiently positive to initiate current flow in the anode circuit, the average value of the current flowing in the latter circuit is controlled as desired. Thus, it will be seen that if an alternating voltage is supplied to the control grid of the electric valve apparatus, the point in the cycle of applied anode voltage at which the grid becomes sufficiently positive to initiate current flow may be varied by shifting the phase of the grid voltage with respect to that of the anode voltage.

As shown in the drawing, alternating voltage is supplied to the grids, or input circuits, of the electric valves 18 by means of a suitable grid transformer 20 and to the grids, or input circuits, of the valves 19 by means of a grid transformer 21. The primary windings of the grid transformers 20 and 21 are connected in series relationship with each other and are in turn connected to the terminals of the secondary winding of a grid biasing transformer 22, one terminal of the primary winding of which is connected to the lower side of the supply source 16 and the opposite terminal of which is connected to an intermediate point on the primary winding of the supply transformer 17. The phase relationship between the grid bias and anode voltages of the electric valve apparatus is illustrated in the vector diagram of Fig. 2, in which the anode voltage is represented by the vertical vector $E_a$ and the grid bias voltage is represented by the vector $E_b$ and the phase relationship of these voltages is represented by the angle between the vectors $E_a$ and $E_b$. When the grid voltage is in phase with the anode voltage, maximum current is delivered to the output circuit of the electric valve apparatus and when the grid voltage is 90° or more out of phase with the anode voltage, substantially no current flows in the output circuit. For intermediate phase relationships of these voltages, the current flow in the output circuit is proportional to the phase relationship.

In order to vary or control the phase relationship between the grid voltages, suitable means are provided. In the illustrated embodiment, these means are shown as rotary induction devices 23 and 24 of the type used in systems for the electrical transmission of motion. The device 23 associated with the control device 12 is referred to as a transmitter and correspondingly the device 24 associated with the controlled element is referred to as the receiver. These devices are connected between the supply source 16 and the grid circuit of the electric valve apparatus.

The transmitting device has a stator member provided with a poly-circuit winding which is physically similar to the three-phase winding of an alternating current dynamo electric machine and is also provided with a rotor member having a single phase rotor winding arranged in inductive relationship with the stator winding. The receiving device 24 is in all respects identical in construction with the transmitting device. As shown, the three equi-spaced stator winding terminals of the transmitting device 23 are connected to the three corresponding stator winding terminals of the receiving device by means of the conductors 25.

Alternating voltage is supplied to the rotor winding of the transmitting device 23 from the source 16. One terminal of the rotor winding is connected to the upper side of the supply source 16, whilst the opposite terminal is connected to the lower side of the supply source through a portion of a voltage divider device 26 which is connected across the lower and middle sides of the supply source. As a result of this connection, the voltage supplied to the transmitting device 23 is substantially in phase with the anode voltage of the electric valve apparatus, but slightly leading with respect thereto. This voltage causes a current to flow in the rotor winding of the transmitting device and this current, due to the connections described causes a voltage to be induced in the rotor windings of the receiving device 24, the magnitude of which depends upon the relative position of an axis of the rotor winding with respect to the axis of the magnetic field of the stator winding. The voltage thus induced in the rotor winding of the receiving device 24 is supplied to the grid circuit of the electric valve apparatus 13 by means of conductors 27 and 28 which are respectively connected to a mid-point of the secondary winding of the grid biasing transformer 22 and to a point between the primary windings of the grid transformers 20 and 21.

Since the voltage supplied to the primary winding of the transmitting device 23 is substantially in phase but slightly leading with respect to the anode voltage, the component voltage supplied to the grid circuit of the electric valve apparatus from the receiving device 24 is of substantially the same phase and is represented by the vector $E_c$ for the pair of valves 18, and the corresponding component voltage for the pair of valves 19 is represented by the vector $E_{c1}$ 180° out of phase with the vector $E_c$. It will thus be seen that the resultant voltage, i. e. the actual voltage supplied to the grids of the electric valve apparatus is made up of two components $E_b$ and $E_c$ for the pair of valves 18 and is represented by the resultant vector $E_g$. Similarly the resultant or actual grid voltage for the pair of valves 19 is made up of the two components $E_b$ and $E_{c1}$ and is represented by the resultant vector $E_{g1}$. The diagram of Fig. 2 holds only for the condition in which the system, i. e. the pilot device and the controlled device are out of correspondence in one direction. If the system is out of correspondence in the opposite direction, the vectors $E_c$ and $E_{c1}$ and the voltages which they represent are of course reversed.

Initially, the system is so arranged that when the pilot device 12 and the controlled objects 10 are in correspondence with each other the axis of the rotor winding of the receiver 24 is substantially at right angles with the axis of the magnetic field of the stator winding so that the voltage induced in the rotor winding is substantially zero. Consequently, the components of voltage supplied to the grid circuit of the electric valve apparatus and represented by the vectors $E_c$ and $E_{c1}$ are substantially zero so that the vectors $E_g$ and $E_{g1}$ coincide with the vector $E_b$. In other words, the voltage actually applied to the grid circuit when the system is in correspondence is the voltage which is supplied from the source 16 through the grid bias transformer 22, and is represented by the bias voltage $E_b$.

When the grid and anode voltages are substantially 90° out of phase with each other, as is the case when the system is in correspondence, the current flow in the output circuit of the electric valve apparatus is minimum or substantially zero. When the axis of the rotor winding of the receiver is parallel with the axis of the magnetic field of the stator winding, the voltage induced in the rotor winding is maximum with the result that the magnitude of the vectors $E_c$ and $E_{c1}$ is also maximum. As the magnitude of the vector $E_{c1}$ increases, the vector $E_g$ which represents the actual or resultant voltage applied to grids of the pair of electric valves 18 is shifted closer to the in-phase relationship with the anode voltage, whilst the voltage $E_{g1}$ which represents the actual voltage applied to the grids of the pair of electric valves 19 is shifted further out of phase with the anode voltage.

The rotor of the transmitter 23 is connected by suitable gearing to the pilot device 12 and similarly the rotor of the receiver 24 is connected by a suitable gearing to the controlled object 10. Rotation of the pilot device 12 controls the rectified voltage of the electric valve apparatus 13 so that the motor 11 drives the controlled object 10 into correspondence with the pilot device.

The electric valves have a maximum current rating which cannot be exceeded without damaging the tubes. For the purpose of limiting the current supplied by the electric valve apparatus to the motor 11 so that the current does not exceed the maximum permissible value, a suitable reactance device 29 is included in the power connections between the source 16 and the primary winding of the supply transformer 17. This reactance device is shown as comprising two transformers, the primary windings 29a and 29b of which are connected in parallel with each other in the power connection to the supply transformer and the secondary windings 29c and 29d of which are connected in series relationship with each other and relatively reversed as illustrated. Direct current is supplied to the windings 29c and 29d from a suitable source of direct current represented by the two supply lines 30 and a suitable variable resistance 31 is included in the connections for varying the degree of saturation of the reactance device. As thus constructed the reactance device is of the type known as a saturable core reactance device. As long as the direct current ampere turns exceed the alternating current ampere turns, the reactance of the alternating current windings is very low and consequently the reactive voltage drop across the alternating current windings is correspondingly low. However, as soon as the alternating current ampere turns begin to exceed the direct current ampere turns, the reactance rises very abruptly and similarly the reactive voltage drop across the alternating current winding rises very abruptly. In other words, when the load current is low the reactance and the reactive voltage drop of the reactive device is very low and when the load current is high the reactance and the reactive voltage drop are greatly increased. This condition is illustrated in Fig. 3 in which the curve 32 represents the relationship between the reactance of the reactance device 29 and the load current, and the curve 33 represents the relationship between the reactance voltage drop in percentage of line voltage and the current supplied to the motor in percentage of full load current.

With the above understanding of the apparatus and its organization in the complete system, the operation of the system itself will readily be understood from the following description.

When the gun 10 and telescope 12 are in correspondence with each other, the phase relationship between the grid and anode voltages of the electric valve apparatus is substantially 90° lagging so that no current is supplied to the motor 11 and the system is at rest. Under this condition, the rotor winding of the receiver 24 is at right angles with the magnetic field of the stator winding so that the voltages represented by the vectors $E_c$ and $E_{c1}$ are zero. Therefore, the actual grid voltage $E_g$ coincides with the voltage represented by the vector $E_b$. Since there is no load on the system, the reactive voltage drop across the reactance windings 29a and 29b of the saturable reactor is low as shown in Fig. 3 and this low reactive voltage drop is represented by the vector $E_z$. When the motor is at standstill, the rectifying apparatus consumes a substantially wattless lagging current and, therefore, the voltage drop across the reactance windings is substantially in phase with the line voltage and therefore with the anode voltage as shown in Fig. 2 and the sum of the anode voltage and the reactive voltage is equal to the line voltage.

Rotation of the telescope 12 in one direction, for example, a clockwise direction, causes a voltage to be induced in the rotor winding of the receiver 24 so that the voltages represented by the vectors $E_c$ and $E_{c1}$ increase from zero to a value corresponding to the amount of rotation of the telescope. As the voltage represented by vector $E_c$ increases, the resultant grid voltage represented by the vector $E_g$ is shifted toward the in-phase position with the anode voltage and this causes the electric valves 18 to become conducting and to supply rectified voltage to the motor 11 in such a direction as to cause the motor to drive the gun 10 into correspondence with the telescope 12. Rotation of the telescope 12 in the opposite direction would of course have rendered the electric valves 18 non-conducting and the valves 19 conducting so that current would be supplied to the motor 11 in the reverse direction causing it to drive the gun 10 in the reverse direction into correspondence with the telescope.

When the motor 11 operates at full speed the electric valve apparatus consumes a current at high power factor, because the current through any one valve at any one instant is substantially in phase with the grid voltage. Since the grid voltage is advanced toward the in-phase relationship with the anode voltage to bring the motor up to speed, the power factor of the electric valve apparatus is high when the motor is up to speed. Since the voltage drop across a reactance leads the current, the voltage drop across the reactance winding tends to become out of phase with the line voltage and therefore tends to change the phase of the anode voltage.

This condition is represented by the dotted vectors $E_{x1}$ and $E_{a1}$. The anode voltage thus becomes more lagging when the motor is at full speed than when the motor is at standstill. However, the grid voltage which is derived from the power circuit is in effect more leading with respect to the anode voltage. This tendency to vary the phase relationship between the grid and the anode voltages has the effect of increasing the rectified voltage supplied to the motor when the motor is at full speed. However, as the motor current increases from minimum to maximum, the reactive voltage drop across the reactance windings of the reactor 30 tends to increase and thus tends to shift the anode voltage toward the in-phase relationship with the grid voltage. Thus, while the direct tendency of the reactance in the power circuit is always to decrease the voltage, the indirect tendency of the grid is to increase the rectified voltage and therefore to increase the current supplied to the motor 11. This indirect tendency however takes place only when the motor is at full speed. This is exactly what is desired because the disadvantage of resistance current limiting is that it tends to keep the motor speed down when speed is actually needed to keep the system from becoming out of correspondence.

However, if at any time during the operation, for example when the motor is at rest, the current supplied to the motor should tend to increase rapidly beyond the full load current, the reactance of the reactance device 29 would rise very abruptly as illustrated in Fig. 3. Similarly the reactive voltage drop would increase very rapidly and to such an extent that the current supplied to the motor 11 would be prevented from exceeding the current rating of the electric valve. The tendency, therefore, of the reactance device is to limit the load current so that the alternating current ampere turns will not exceed the direct current ampere turns, whereas at lower current values the reactive voltage drop is inappreciable. The ultimate effect, therefore, of the reactance device is equivalent to the introduction of a resistance in the power circuit only when the motor is at standstill, whereas at full speed the effect of the resistance drop disappears.

There are times in the operation of this system in which the gun 10 may tend to overrun the position of correspondence with the telescope 12 and under this condition the electric valve apparatus operates as an inverter to return the energy to the line and to cause the motor 11 to act as a brake. Due to the large inertia of the gun, the current and forces developed during this braking period are likely to be excessive. Under this condition, the tendency of the reactance device 29 is to limit the current in the manner previously explained and it also has the indirect effect of tending to control the relationship between the anode and grid voltages in a manner that is analogous or opposite to that previously described. In other words, when the motor operates at full speed but with the current reversed so that it acts as a brake returning power to the line the system operates as an inverter and the voltage drop in the reactor is about 90° lagging with respect to its phase during motor operation. Consequently, the anode voltage $E_a$ is shifted in a direction to increase the phase angle between the grid and anode voltages. This condition is shown in Fig. 2 in which the reactive voltage drop is represented by the dotted vector $E_{x2}$ and the anode voltage is represented by the dotted vector $E_{a2}$. As the current tends to increase the reactive voltage drop $E_{x2}$ likewise tends to increase with the result that the anode voltage $E_a$ is advanced further out of phase with the grid voltage. The result of this tendency is to reduce the motor current which under these circumstances is especially desirable.

Although in accordance with the provisions of the patent statutes, this invention is described as embodied in concrete form it will be understood that the apparatus and connections shown and described are merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States, is:

1. A reversible motor control system comprising an electric motor, means for supplying current to said motor for operation in either direction comprising electric valve apparatus provided with input and output circuits, means for supplying alternating voltages to said circuits, means for varying the phase relationship of said voltages to control the current supplied to said motor, and means for limiting the current supplied to said motor comprising a reactance device having a reactance characteristic that increases at a low rate for normal load currents and at a relatively higher rate for load currents in excess of normal load.

2. A reversible motor control system comprising an electric motor, means for supplying said motor with rectified voltage for operation in both directions comprising electric valve apparatus provided with input and output circuits, means for supplying alternating voltages to said input and output circuits, means for varying the phase relationship of said voltages and to control the magnitude and direction of currents supplied to said motor, and means for limiting the current supplied to said motor comprising a saturable reactance device having a non-linear reactance characteristic that increases faster at overload current than at normal load currents.

3. A reversible motor control system comprising a direct current motor, means for supplying rectified voltage to said motor for operation in both directions comprising electric valve apparatus provided with an anode, and a control grid, means for supplying alternating voltages to said anode and grid, means for varying the phase relation between said voltages to vary the current supplied to said motor, and means for advancing the phase of said anode voltage relative to said grid voltage during inverter operation to limit the motor current.

4. A reversible motor control system for a motor driving an inertia load comprising a direct current motor, means for supplying rectified voltage to said motor for operation in both directions comprising electric valve apparatus provided with an anode and a control grid, a phase shifting means for varying the phase relationship between said grid and anode voltages, to control the magnitude and direction of the current supplied to said motor and a reactance device for limiting the motor current and for advancing the phase of said anode voltage relative to said grid voltage to limit the motor current during inverter operation.

5. A reversible motor control system comprising an electric motor, a source of alternating voltage, means for supplying rectified voltage to said motor comprising electric valve apparatus provided with an anode and a control grid, connections from said source for supplying alternating voltages to said anode and grid, means for varying the phase relationship between said anode and grid voltages to vary the magnitude and control the direction of current supplied to said motor, and a saturable core type reactance device having its reactance winding included in the connections between said source and anode for limiting the current supplied to said motor.

6. A reversible motor control system comprising a direct current motor, a source of alternating voltage, means for supplying rectified voltage to said motor comprising electric valve apparatus provided with an anode and a cathode and connections from said source to said anode and grid for supplying alternating voltages thereto, a phase shifting device for varying the phase relationship between said anode and grid voltages to control the magnitude and direction of the current supplied to said motor, and means for limiting the motor current comprising a saturable core type reactance device having a direct current saturating winding and a reactance winding included in the connections between said source and anode, said reactance device having low reactance at low currents and relatively high reactance at high currents so that the current limiting effect of said device is greater at low motor speeds than at high motor speeds.

7. A follow-up motor control system comprising a pilot device, a controlled object, an electric motor for driving said object into positional agreement with said pilot device, means for supplying rectified voltage to said motor comprising electric valve apparatus provided with an anode and a control grid, a source of alternating voltage and connections from said source for supplying alternating voltages to said anode and grid, means for varying the phase relationship between said voltages in accordance with the angular disagreement of said pilot device and controlled object thereby to control the current supplied to said motor and means for limiting the current supplied to said motor comprising a device having a reactance varying with the current supplied to said motor.

8. A follow-up control system for driving an object of relatively large inertia into positional agreement with a pilot device comprising an electric motor for driving said object, a source of alternating voltage, means for supplying rectified current to said motor comprising electric valve apparatus provided with an anode and a control grid and connections from said source to said anode and grid for supplying alternating voltages thereto, means for controlling the phase relationship between said voltages to control the current supplied to said motor, and means for limiting the motor current during motoring operation and for advancing the phase of the anode voltage during inverter operation to limit the current comprising a saturable core type reactance device having its reactance winding included in said connections, a direct current saturating winding, and means for varying the saturation of said device.

ERNST F. W. ALEXANDERSON